United States Patent
Schiering et al.

(10) Patent No.: US 9,869,585 B2
(45) Date of Patent: Jan. 16, 2018

(54) DUAL SPECTROMETER

(71) Applicant: Smiths Detection Inc., Edgewood, MD (US)

(72) Inventors: David W. Schiering, Edgewood, MD (US); Maxim Frayer, Edgewood, MD (US); Peng Zou, Edgewood, MD (US)

(73) Assignee: Smiths Detection Inc., Edgewood, MD (US)

( * ) Notice: Subject to any disclaimer, the term of this patent is extended or adjusted under 35 U.S.C. 154(b) by 396 days.

(21) Appl. No.: 14/412,490

(22) PCT Filed: Jul. 3, 2013

(86) PCT No.: PCT/US2013/049256
§ 371 (c)(1),
(2) Date: Jan. 2, 2015

(87) PCT Pub. No.: WO2014/008359
PCT Pub. Date: Jan. 9, 2014

(65) Prior Publication Data
US 2015/0192462 A1    Jul. 9, 2015

Related U.S. Application Data

(60) Provisional application No. 61/668,693, filed on Jul. 6, 2012.

(51) Int. Cl.
*G01J 3/02* (2006.01)
*G01J 3/44* (2006.01)
(Continued)

(52) U.S. Cl.
CPC ............ *G01J 3/0256* (2013.01); *G01J 3/108* (2013.01); *G01J 3/36* (2013.01); *G01J 3/42* (2013.01); *G01J 3/44* (2013.01); *G01J 2003/106* (2013.01)

(58) Field of Classification Search
CPC ............... G01J 3/0256; G01J 3/36; G01J 3/44
(Continued)

(56) References Cited

U.S. PATENT DOCUMENTS 5,749,830 A    5/1998  Kaneko et al.
6,167,290 A *  12/2000 Yang ................. A61B 5/14532
                                                                600/316
(Continued)

FOREIGN PATENT DOCUMENTS

KR      100323281       4/2002
KR     1020070049088    5/2007
KR      100904685       6/2009

OTHER PUBLICATIONS

Extended Search Report dated May 13, 2016 for EP Appln. No. 13813794.8.

*Primary Examiner* — Seung C Sohn
(74) *Attorney, Agent, or Firm* — Advent, LLP

(57) ABSTRACT

Systems and techniques for optical spectrometer detection using, for example, IR spectroscopy components and Raman spectroscopy components are described. For instance, a system includes a first electromagnetic radiation source configured to illuminate a sample with a first portion of electromagnetic radiation in a first region of the electromagnetic spectrum (e.g., an IR source) and a second electromagnetic radiation source configured to illuminate a sample with a second portion of electromagnetic radiation in a second substantially monochromatic region of the electromagnetic spectrum (e.g., a laser source). The system also includes a detector module configured to detect a sample constituent of a sample by analyzing a characteristic of electromagnetic radiation reflected from the sample associated with the first electromagnetic radiation source and a
(Continued)

characteristic of electromagnetic radiation reflected from the sample associated with the second electromagnetic radiation source.

20 Claims, 14 Drawing Sheets

(51) Int. Cl.
*G01J 3/36* (2006.01)
*G01J 3/42* (2006.01)
*G01J 3/10* (2006.01)

(58) Field of Classification Search
USPC .................................................... 250/208.2
See application file for complete search history.

(56) References Cited

U.S. PATENT DOCUMENTS

| | | | |
|---|---|---|---|
| 2002/0135759 A1* | 9/2002 | Ramamoorthy | G01N 21/65 356/237.2 |
| 2004/0245350 A1 | 12/2004 | Zeng | |
| 2010/0149497 A1 | 6/2010 | Drumm et al. | |
| 2012/0019819 A1* | 1/2012 | Messerchmidt | G01J 3/433 356/301 |

* cited by examiner

DUAL SPECTROMETER

BACKGROUND

Generally, infrared (IR) spectroscopy (which is broadly defined herein to include, but is not necessarily limited: to near-infrared (NIR), mid-infrared (MIR), and far-infrared (FIR)) is based on molecular vibration and rotation modes, as well as combination and overtone bands. Because molar absorptivity in the near-infrared (NIR) region of the electromagnetic spectrum can be quite small, NIR radiation can typically penetrate quite far into a sample (e.g., as compared to mid-infrared (MIR) radiation). Thus, IR spectroscopy techniques, such as diffuse reflectance NIR spectroscopy, can be useful for probing bulk material. Further, NIR spectroscopy generally requires limited or no sample preparation. Near-infrared spectroscopy (NIRS) can be used in materials characterization and molecular analysis applications as diverse as pharmaceuticals, medical diagnostics, neurology, neuroimaging, neonatal research, urology, food and agrochemical quality control, combustion product analysis, sports medicine, sports science, sports training, ergonomics, rehabilitation, and so forth.

Raman spectroscopy, another form of vibrational spectroscopy, can be used to determine vibrational, rotational, and/or other vibrational modes of a sample and/or sample components. Generally, Raman spectroscopy uses inelastic scattering (e.g., Stokes and Anti-Stokes scattering) of monochromatic light, which can be furnished using, for instance, a laser in the visible, NIR, or ultraviolet range. The laser light interacts with a sample, which shifts the energy of photons scattered by the sample from the laser. The energy shift can provide information about vibrational modes of the molecules that constitute the sample. Frequencies of molecular vibrations are specific to the chemical bonds and symmetry of molecules; thus the vibrational spectrum can be used to identify a particular sample and/or sample components. With Raman spectroscopy, little or no sample preparation is required. Further, Raman spectra can be collected from small volume samples (e.g., measuring less than approximately one micrometer (1 µm) in diameter). Raman spectroscopy can also be used in diverse applications including pharmaceuticals, medicine, chemistry, physics, nanotechnology, and so forth.

SUMMARY

Systems and techniques for optical spectrometer detection using, for example, IR spectroscopy components and Raman spectroscopy components are described. For instance, a system includes a first electromagnetic radiation source configured to illuminate a sample with a first portion of electromagnetic radiation in a first region of the electromagnetic spectrum (e.g., an IR source) and a second electromagnetic radiation source configured to illuminate a sample with a second portion of electromagnetic radiation in a second substantially monochromatic region of the electromagnetic spectrum (e.g., a laser source). The system also includes a detector module configured to detect a sample constituent of a sample by analyzing a characteristic of electromagnetic radiation reflected from the sample associated with the first electromagnetic radiation source and a characteristic of electromagnetic radiation reflected from the sample associated with the second electromagnetic radiation source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Figure 1A:
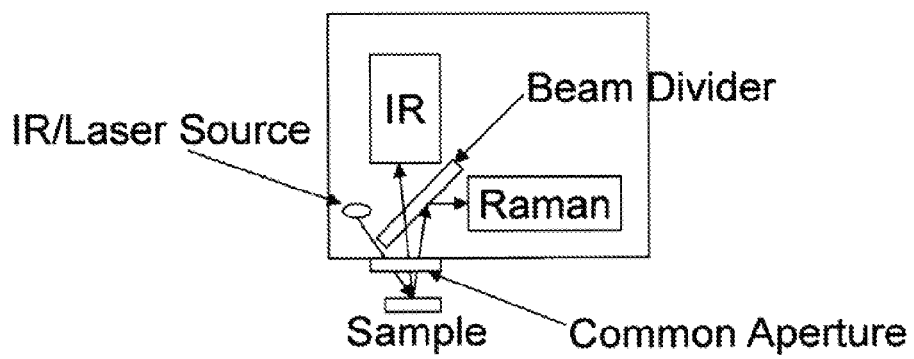
FIG. 1A is a diagrammatic illustration of a spectroscopy system including an IR spectroscopy portion and a Raman spectroscopy portion, where the IR spectroscopy portion and the Raman spectroscopy portion share a common aperture, optical path, and sampling position in accordance with example implementations of the present disclosure.
Figure 1B:
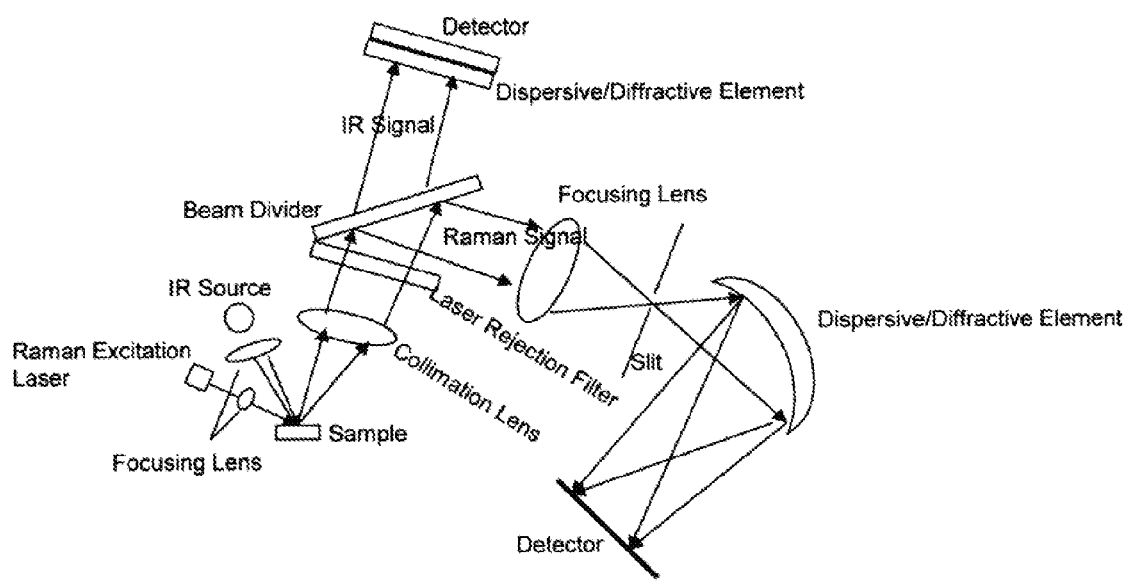
FIG. 1B is a diagrammatic illustration of a spectroscopy system, such as the spectroscopy system illustrated in FIG. 1A, where the spectroscopy system includes an IR spectroscopy portion and a Raman spectroscopy portion, where an IR signal and a Raman signal are separated using a beam divider (e.g., a dichroic beam splitter, a spatially coated beam splitter, a partial mirror, and so forth), and where the dispersive/diffractive component can be a grating, a linear variable filter, a Fabry-Perot interferometer, a Michelson interferometer, and so forth in accordance with example implementations of the present disclosure.
Figure 1C:
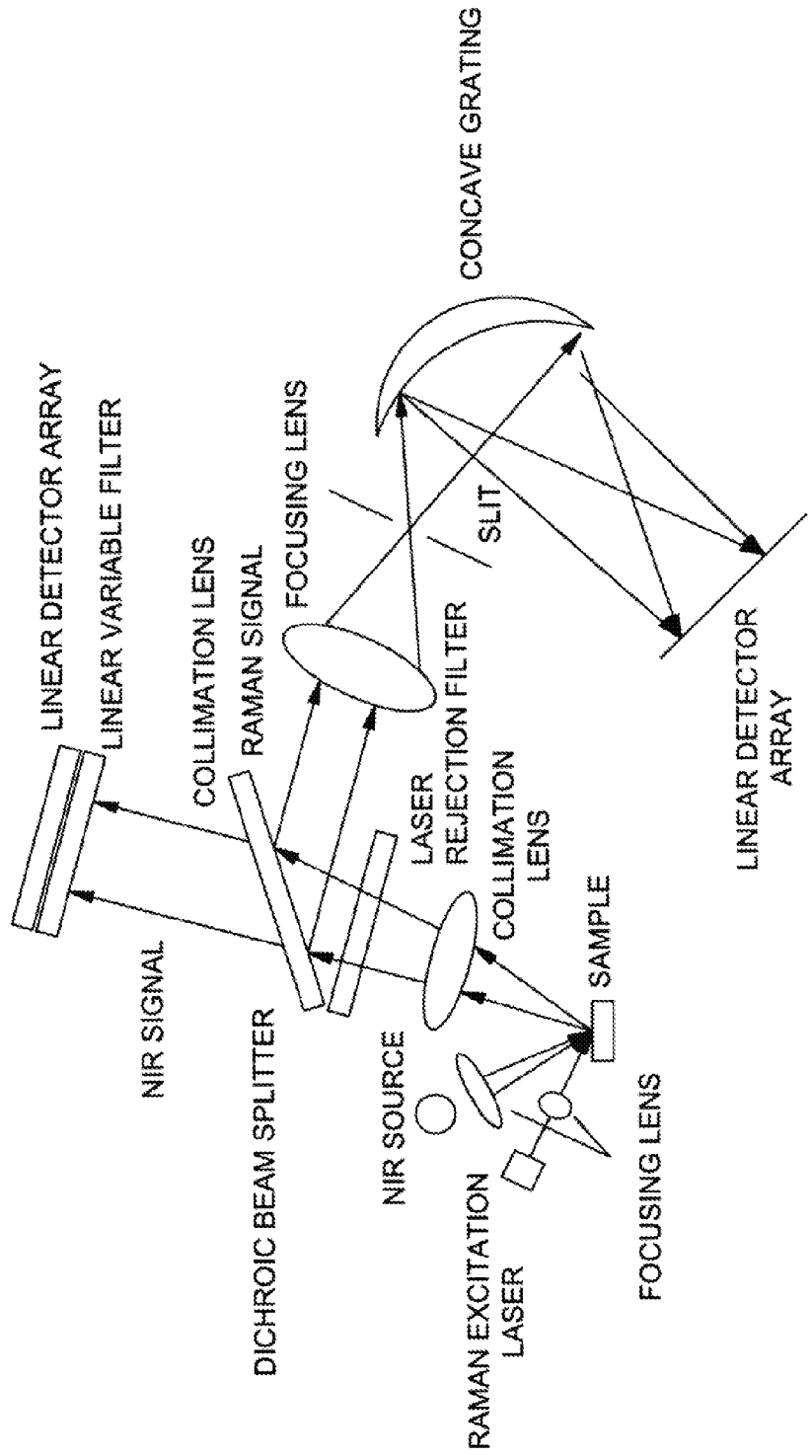
FIG. 1C is a diagrammatic illustration of a spectroscopy system including an IR spectroscopy portion and a Raman spectroscopy portion, where the IR spectroscopy portion and the Raman spectroscopy portion share a common aperture in accordance with example implementations of the present disclosure.
Figure 1D:
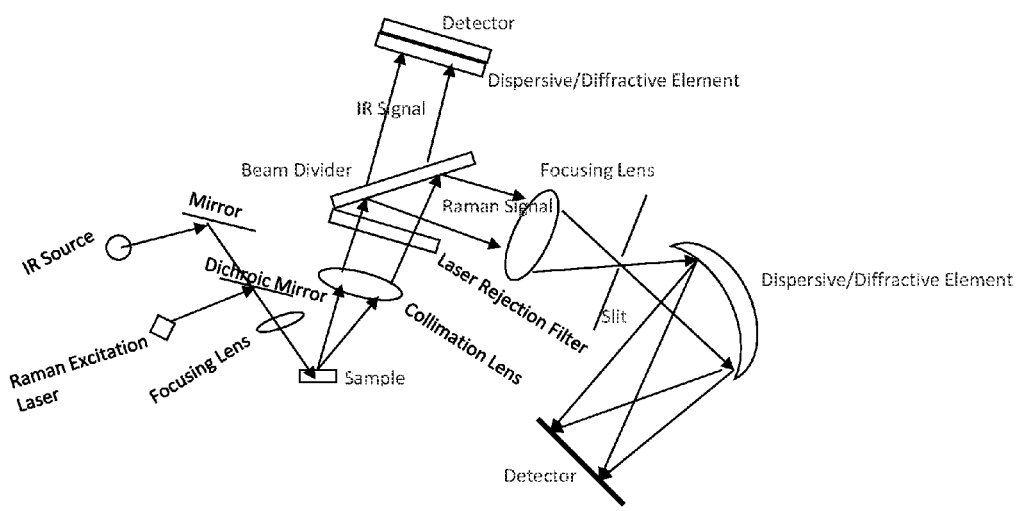
FIG. 1D is a diagrammatic illustration of a spectroscopy system including an IR spectroscopy portion and a Raman spectroscopy portion, where the IR spectroscopy portion and the Raman spectroscopy portion share a common sampling portion in accordance with example implementations of the present disclosure and where the IR source and Raman laser source are combined with a dichroic mirror.

Spectroscopy systems may include an IR spectroscopy portion and a Raman spectroscopy portion. As described herein, a spectroscopy system can be implemented as a miniature IR-Raman spectrometer. Spectroscopy systems in accordance with the present disclosure can provide improved optical spectrometer detection performance using, for example, both miniature IR spectroscopy components and miniature Raman spectroscopy components. In some instances, two or more spectroscopy components that employ different spectroscopic techniques are included in a single instrument, which can enhance overall spectrometer performance by improving detection probability, decreasing the rate of false alarms, increasing the number of detectible substances (e.g., chemicals), and/or providing improved operational spectrometer characteristics. For example, a spectroscopy system can be implemented as a handheld instrument for quickly detecting and/or identifying a broad range of substances (e.g., chemicals) regardless of color and/or other physical properties. In other instances, two or more separate spectroscopies can be used together in a spectroscopy system, providing functionality for minimizing artifacts and/or interferences that each spectroscopic technique would otherwise have individually. The different spectroscopies can be connected together using wired connection schemes, wireless connection schemes, and so forth. Further, in some instances, the spectroscopy system can be remotely operated (e.g., using a wireless connection interface).

In implementations, using the functionality of both an IR spectrometer and a Raman spectrometer together can provide enhanced analysis capabilities that may not otherwise be attainable using either spectroscopic technique individually. For example, a change in molecular polarization potential (e.g., with respect to a vibrational coordinate) is generally required for a molecule to exhibit the Raman effect, and the amount of a polarizability change determines Raman scattering intensity. The pattern of shifted frequencies is determined by the rotational and vibrational states of the sample. This dependence on the polarizability of a sample differs from IR spectroscopy, where the interaction between a sample and light is determined by dipole moment-changes. Thus, with Raman spectroscopy, transitions can be analyzed that might not be measurable using IR spectroscopy and vice versa. For example, for a vibrational mode to be Raman active (e.g., where Raman scattering can be measured), a change of polarizability for that mode is required. This dependence on the polarizability of a sample differs from IR spectroscopy, where the interaction between a sample and light is determined by an harmonicity of overtone and/or combination bands. Because of different selection rules, Raman and IR spectroscopic techniques measure different molecular properties, which can be complementary and provide more accurate chemical identification and molecular structure analysis. For instance, spectra from the two orthogonal technologies can be analyzed in a synchronized manner using spectral data fusion and/or spatial data fusion techniques.

In implementations, the spectroscopy system can increase the range of chemicals and materials that can be identified and/or detected. Because the IR spectroscopy portion and the Raman spectroscopy portion function in a complementary manner, the spectroscopy system can provide functionality for chemical and material detection that may not be possible using either of these spectroscopic techniques individually. For instance, fluorescence from colored samples can make Raman measurement difficult, while IR detection may be substantially unaffected by fluorescence. In some instances, longer wavelength laser light can be used with a Raman spectrometer to reduce the fluorescence of an illuminated sample. However, because Raman scattering intensity can rapidly decrease as laser wavelength increases, higher power lasers and/or more sensitive Raman detectors may be required. Further, an NIR spectrometer with a single detector or detector array (e.g., an InGaAs array) may be limited to a wavelength range of between about nine hundred nanometers (900 nm) and two thousand two hundred nanometers (2,200 nm), where absorption bands are mostly from nitrogen-hydrogen (N—H), oxygen-hydrogen (O—H), and carbon-hydrogen (C—H) overtones. Thus, a chemical with no N—H, O—H, or C—H bond (for example, substances like inorganic salts, such as Potassium Nitrate ($KNO_3$)), may have substantially no near-infrared signature, and may not be detectable using IR spectroscopy detection techniques. However, these inorganic substances may be readily detectable with Raman spectroscopy techniques.

The spectroscopy systems can be used for explosive detection, hazardous material detection, unknown compound identification, molecular structure characterization, and so forth. In some instances, IR spectroscopy functionality and/or Raman spectroscopy functionality can be used in different modes of operation, such as sequentially, simultaneously, independently, and so forth. Different operational modes can be selected based upon a particular application. For example, a sequential operating mode can be selected when detecting and/or identifying energetic material, such as explosives. In this configuration, the IR spectroscopy portion of a spectroscopy system can be used as a prescreening tool prior to use of the Raman spectroscopy portion. Because the IR spectroscopy portion can be operated using, for instance, a low power incandescent light source, it may not be necessary to prevent or minimize exposure of an operator's eye to light emitted from the incandescent light source. Further, an incandescent light source may be substantially less likely to burn and/or ignite an energized substance, such as an explosive chemical. In other instances, the Raman spectroscopy portion of a spectroscopy system can be used as a prescreening tool prior to use of the IR spectroscopy portion.

In some instances, the IR spectroscopy portion of a spectroscopy system can be used to quickly classify a sample, while the Raman spectroscopy portion can be used to provide further specificity. For example, both Ammonium Nitrate ($NH_4NO_3$) and Ammonium Perchlorate ($NH_4ClO_4$) have similar Nitrogen-Hydrogen (N—H) vibration overtone features. When detecting and/or identifying these substances, the IR spectroscopy portion of a spectroscopy system can be used to quickly identify the presence or absence of an NH functional group. Because Raman scattering for these substances is generally weak, and Raman detection and/or identification may require longer signal integration, the Raman spectroscopy portion can be used subsequently in instances where the presence of these substances is suspected as a result of initial IR spectroscopic analysis and/or when the IR spectroscopy portion may not provide a desired specificity. This technique can provide increased sample throughput by limiting use of the Raman spectroscopy portion.

In other implementations, the IR spectroscopy portion and the Raman spectroscopy portion of a spectroscopy system can be used in parallel or at least substantially simultaneously. This configuration can be used when high throughput and/or specification are desirable and/or where there is at least substantially no potential for burning and/or igniting a sample, such as in settings including, but not necessarily limited to: industrial processing, food processing, pharmaceuticals, and so forth. In further implementations, the IR spectroscopy portion of a spectroscopy system can be operated continuously, while the Raman spectroscopy portion can be operated periodically (e.g., at regular intervals, random intervals, pseudorandom intervals, and so forth). Periodic operation of the Raman spectroscopy portion in this manner can improve throughput and/or reduce power consumption by periodically confirming the presence and/or absence of substances identified and/or detected using the IR spectroscopy portion, while not requiring continuous operation of the Raman instrumentation. For example, techniques in accordance with the present disclosure can reduce the amount of battery power consumed by a portable spectroscopy system. In still further implementations, a user can selectively operate the IR spectroscopy portion and/or the Raman spectroscopy portion of a spectroscopy system as desired.

In implementations, the IR spectroscopy portion of the spectroscopy system can implement various spectroscopic analysis techniques. The IR spectroscopy portion of the spectroscopy system can be configured to facilitate spectroscopic analysis in an IR region of the electromagnetic spectrum, such as a near-infrared (NIR) region of the electromagnetic spectrum (e.g., wavelengths ranging from approximately seven hundred eighty nanometers (780 nm) to approximately three thousand nanometers (3,000 nm)). For example, the IR spectroscopy portion of the spectroscopy system can be configured to implement near-infrared spectroscopy (NIRS) techniques. However, NIRS is provided by way of example only and is not meant to be restrictive of the present disclosure. Thus, the IR spectroscopy portion of the spectroscopy system can be configured to implement IR spectroscopy techniques in other various regions of the electromagnetic spectrum, including, but not necessarily limited to: mid-infrared (MIR), far-infrared (FIR), and so forth. For instance, the IR spectroscopy portion of the spectroscopy system can be configured to implement mid-infrared spectroscopy (MIRS) techniques in an MIR region of the electromagnetic spectrum (e.g., wavelengths ranging from approximately two and one-half micrometers (2.5 μm) to approximately fifty micrometers (50 μm)). The IR spectroscopy portion of the spectroscopy system can include an IR source, an IR detector, and a dispersive, interferometric, and/or diffractive component.

The IR source can be a broadband source of, for example, NIR radiation, such as a tungsten vacuum light source (e.g., a tungsten lamp), an incandescent light bulb, a quartz halogen light bulb, a light-emitting diode (LED), and so forth. In a specific example, a tungsten vacuum source is used. In some instances, multiple sources of IR radiation can be included with an IR source, and a particular source of IR radiation can be selected based upon a specific sample or group of samples.

The IR detector can include one or more detector components, which can be selected based upon a range of electromagnetic wavelengths to be measured. For example, the IR detector can include, but is not necessarily limited to: an indium gallium arsenide (InGaAs) detector array, a lead(II) sulfide (PbS) detector array, a silicon-based charge-coupled device (CCD), and so forth. In some instances, a two-dimensional (2D) array detector using an acousto-optic tunable filter can be used to record multiple images sequentially at different narrow wavelength bands. The IR spectroscopy portion of the spectroscopy system can also be configured to operate with other spectroscopic analysis instrumentation, including optical instruments that operate in other regions of the electromagnetic spectrum, such as ultraviolet (UV) wavelengths, visible wavelengths, and so forth.

In some instances, both silicon-based detectors and InGaAs detectors can be employed. In these configurations, UV, visible, and NIR spectra can be recorded together. Further, a spectroscopy instrument configured for one range of electromagnetic wavelengths may also be used for another range of wavelengths. For instance, the range of an MIR instrument may extend at least partially into the NIR. Thus, in some instances, a single IR detection component can be used for both NIR and MIR. In other implementations, a spectroscopy instrument configured for UV and/or visible light may be capable of recording spectra in at least a portion of the NIR range. Thus, an IR detection component may comprise one or more UV and/or visible light detectors.

The dispersive component can be a prism, a diffraction grating, an interferometer, a linear variable filter, and/or another component that allows the intensity of electromagnetic radiation at different wavelengths to be recorded.

In implementations, multivariate (multiple variables) calibration techniques, including, but not necessarily limited to: principal components analysis, partial least squares, artificial neural networks, and so forth, can be used to determine chemical information regarding a particular sample.

Fourier transform techniques can be used with the IR spectroscopy portion of the spectroscopy system. For example, time-domain and/or space-domain measurements of electromagnetic radiation can be analyzed using Fourier transform infrared spectroscopy (FT-IR) techniques. In some instances, an interferometer can be used (e.g., with wavelengths greater than approximately one thousand nanometers (1,000 nm)). Additionally, a spectrum can be measured using either reflection or transmission (e.g., depending upon a particular sample).

In implementations, the Raman spectroscopy portion of the spectroscopy system can implement various spectroscopic analysis techniques. The Raman spectroscopy portion of the spectroscopy system can be configured to facilitate imaging of the entire field of view of the Raman instrumentation. For example, scattering can be examined over a range of wavenumbers (Raman shifts) using direct imaging techniques. In other instances, hyperspectral imaging, or chemical imaging, can be used to collect a multiplicity (e.g., thousands) of Raman spectra from the field of view of the Raman instrumentation, which can then be used to generate images representing the locations and/or amounts of various sample components. The Raman spectroscopy portion of the spectroscopy system can include an excitation light source, a Raman detector, and a monochromator.

The light source can be a source of at least substantially monochromatic light, such as an excitation laser, having a substantially greater irradiance (e.g., amount of electromagnetic radiation per unit area) than the IR source. For example, the light source can include, but is not necessarily limited to: a diode laser, a gas laser, a crystal laser, and so forth. In a specific example, a focused diode laser is used. In some instances, the excitation laser can be a polarized excitation laser. In implementations, the light source can be implemented using a coaxial laser with a ninety degree (90°) prism configured to focus the laser light onto a sample plane. However, a coaxial laser is provided by way of example only and is not meant to be restrictive of the present disclosure. Thus, in other implementations, the light source can be implemented as a non-coaxial laser. Further, the light source can be implemented using a light shield. For example, a CCD array can be shielded from, for instance, a laser path of a light source.

The light source can furnish light having various characteristics. For example, different laser wavelengths can be selectively used to illuminate a sample. In some instances, multiple lasers (e.g., configured as a laser array) having various wavelengths can be included with a light source, and a particular laser or wavelength can be selected based upon a specific sample or group of samples. For instance, the IR spectroscopy portion can be used to determine a laser wavelength that is suited for a particular sample or sample type, and that laser wavelength can be selectively activated.

The Raman detector can comprise one or more detector components, including, but not necessarily limited to: a CCD, a photomultiplier tube (PMT), a photodiode, and so forth. In instances where the light source comprises a polarized excitation laser, the Raman detector can be implemented using a polarization analyzer, which can acquire spectra at multiple orientations (e.g., both perpendicular and parallel) with respect to the excitation plane of the light source. The spectra can be used to calculate a depolarization ratio, which can be used to determine symmetry, Raman activity, and/or peaks in the spectra.

After light reflected from the illuminated spot or sample is collected with a lens, the collected light is directed to an optical filter, which can be used to filter wavelengths close to, for instance, the laser line of the light source, while the rest of the collected light from the sample is dispersed by a monochromator onto the Raman detector. In some instances, the optical filter can be a holographic grating with multiple dispersion stages, configured to attain a high degree of laser rejection. Thus, the optical filter can also be implemented using a laser notch filter and/or a laser edge filter for laser rejection.

The monochromator can be a flat field concave grating with a holographically recorded pattern. However, a holographic grating is provided by way of example only and is not meant to be restrictive of the present disclosure. Thus, the monochromator can also be implemented using a holographic transmission grating, a holographic plane grating, a ruled plane grating, and so forth.

Fourier transform techniques can be used with the Raman spectroscopy portion of the spectroscopy system. For example, time-domain and/or space-domain measurements of spectra can be analyzed using Fourier transform Raman spectroscopy techniques (FT-Raman).

In implementations, both the IR spectroscopy portion of the spectroscopy system and the Raman spectroscopy portion of the spectroscopy system can be included in a single instrument. This can reduce the overall size and/or weight of the spectroscopy system, as well as a required power budget.

The IR spectroscopy portion and the Raman spectroscopy portion can have a common optical path, sharing the same optical sampling aperture and collimation optics (e.g., as illustrated in FIG. 1) and focusing on the same spatial spot. In other instances, the IR spectroscopy portion and the Raman spectroscopy portion can have individual sampling apertures, which can be focused on the same spatial spot. It should be noted that by measuring the same spatial spot, IR and Raman spectra can be collected without requiring instrumentation to be physically moved and/or rotated.

In a specific instance, the sampling aperture can be implemented using an eleven and one-half millimeter (11.5 mm) wide, single aperture glass element having a confocal field of view (FOV). The sampling aperture can be separated from the surrounding environment using, for example, a window of sapphire coated glass, which can contact a sample and thus set a focal distance in some instances. However, this particular sampling aperture is provided by way of example only and is not meant to be restrictive of the present disclosure. Thus, in other implementations, different sampling apertures can be used. In some instances, the spectroscopy system can include a lens cap for at least substantially covering a sampling aperture.

IR diffuse reflection and Raman scattering can be separated using, for example, a dichroic coated beam splitter, a spatially separation aperture, a half mirror, a partially/differently coated beam splitter, and so forth that can diverge IR and Raman to their individual detectors. For instance, a beam divider can be implemented as a plate oriented at a forty-five degree (45°) angle with respect to a sampling aperture, where a Raman signal is at least substantially reflected from the beam divider plate, while an IR signal is at least substantially transmitted through the beam divider plate. This can allow for simultaneous operation of the IR spectroscopy portion and the Raman spectroscopy portion. Other beamsplitter configurations can also be used, including, but not necessarily limited to: aperture splitting and/or other spatial beamsplitting techniques.

In implementations, the IR and Raman signals can be detected by a detector module having a linear InGaAs array for detecting IR signals and a CCD array for detecting Raman signals. The InGaAs array can be positioned in close proximity to a linear variable filter for separating the IR spectrum radiation into component wavelengths. However, a linear InGaAs array and a CCD array are provided by way of example only and are not meant to be restrictive of the present disclosure. Thus, in other implementations, the detector module may use different detection techniques (e.g., as previously described). For example, the detector module can use an InGaAs array or a CCD array for detecting both IR signals and Raman signals.

Figure 2:
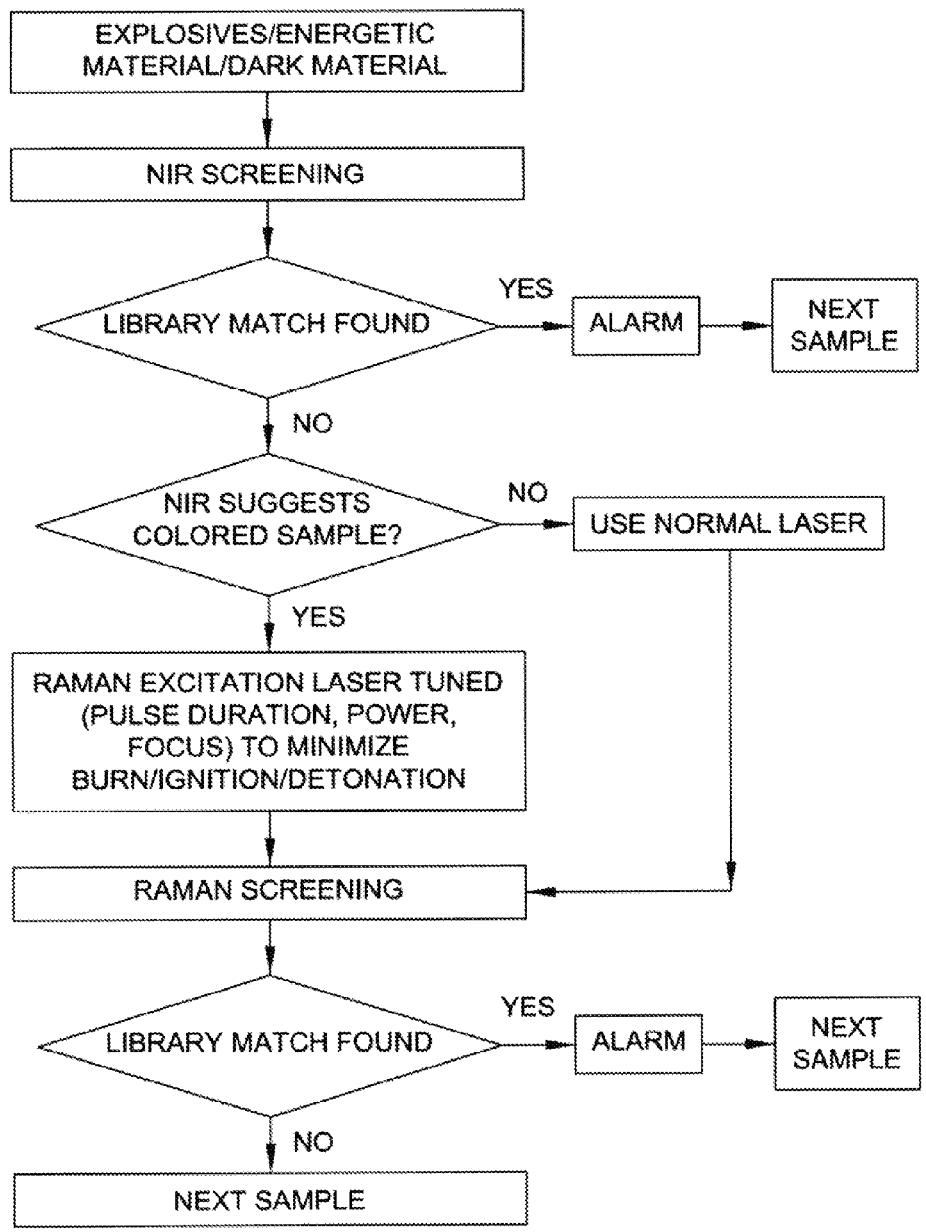
FIG. 2 is a flow diagram illustrating a method for operating an IR spectroscopy portion and a Raman spectroscopy portion of a spectroscopy system in a sequential mode of operation in accordance with example implementations of the present disclosure.
Figure 3:
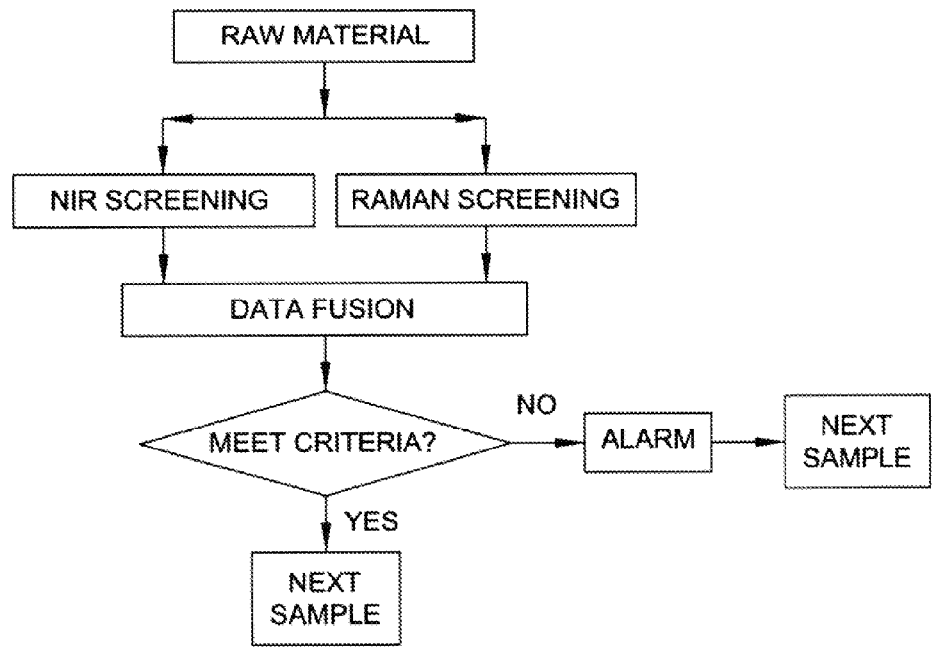
FIG. 3 is a flow diagram illustrating a method for operating an IR spectroscopy portion and a Raman spectroscopy portion of a spectroscopy system in a parallel and/or substantially simultaneous mode of operation in accordance with example implementations of the present disclosure.
Figure 4:
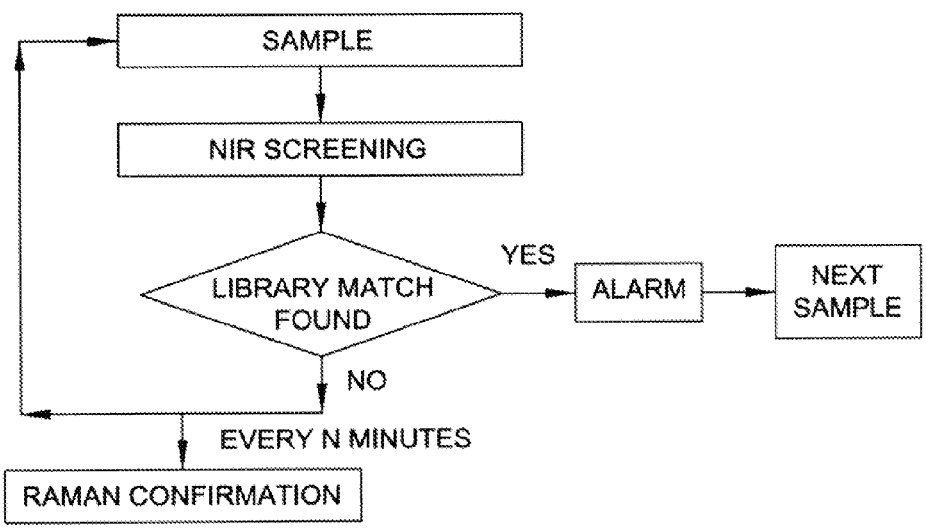
FIG. 4 is a flow diagram illustrating a method for operating an IR spectroscopy portion of a spectroscopy system more frequently than a Raman spectroscopy portion of the spectroscopy system (e.g., for providing confirmation of results from the IR spectroscopy portion using the Raman spectroscopy portion) in accordance with example implementations of the present disclosure.
Figure 5A:
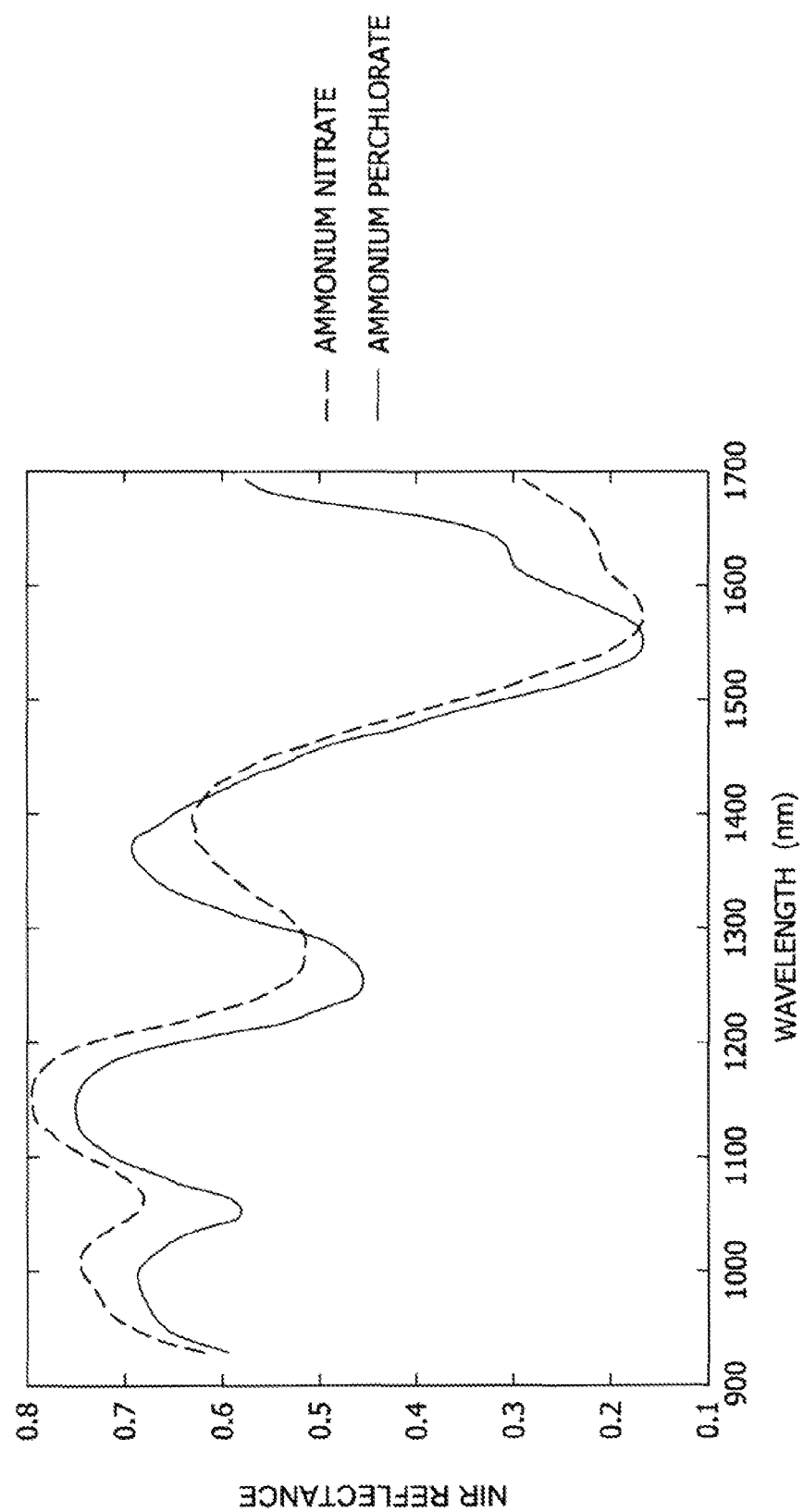
FIG. 5A is a graph illustrating near-infrared reflectance spectra of Ammonium Perchlorate and Ammonium Nitrate versus wavelength.
Figure 5B:
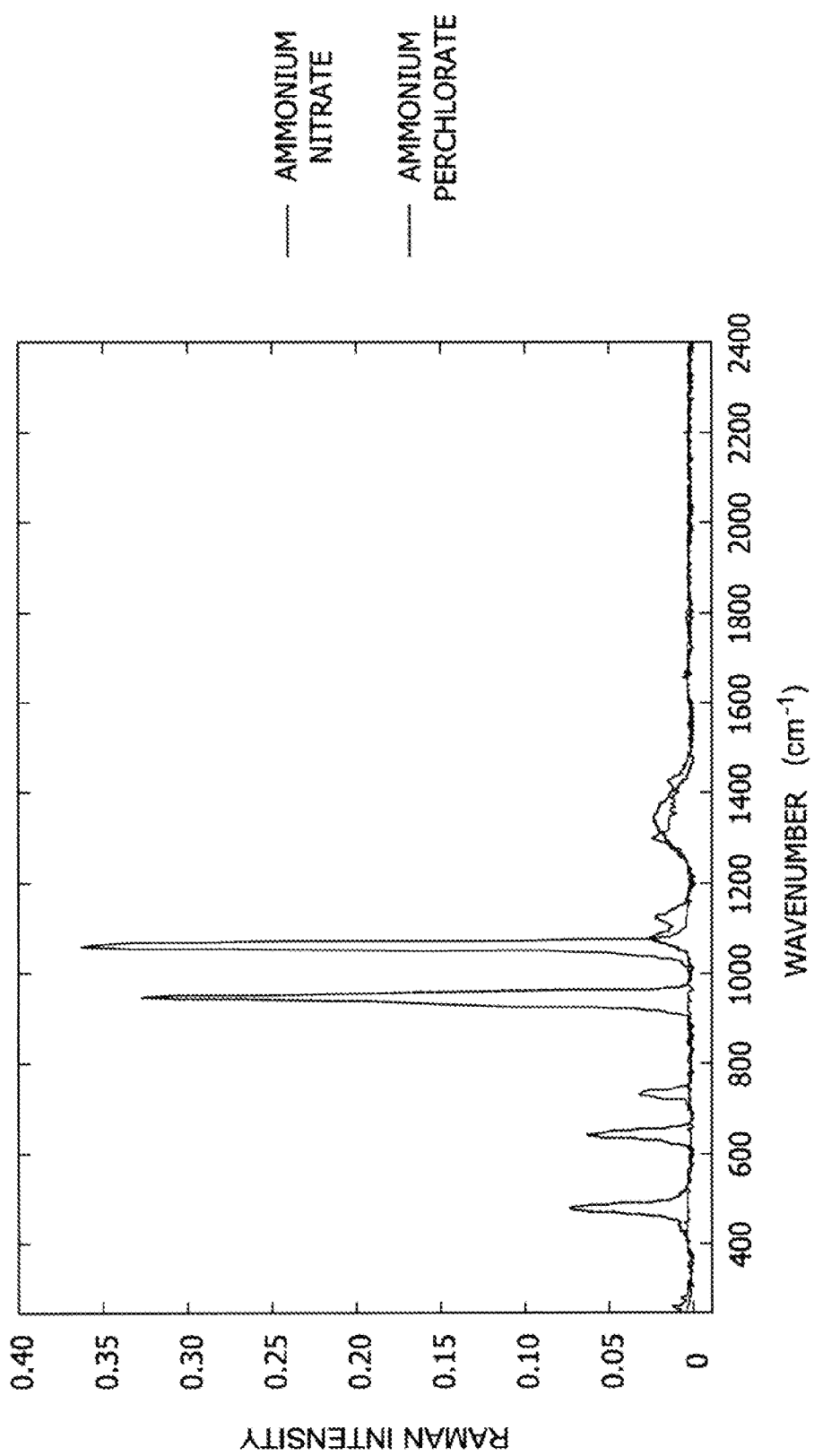
FIG. 5B is a graph illustrating Raman spectra of Ammonium Perchlorate and Ammonium Nitrate versus wavelength.
Figure 6:
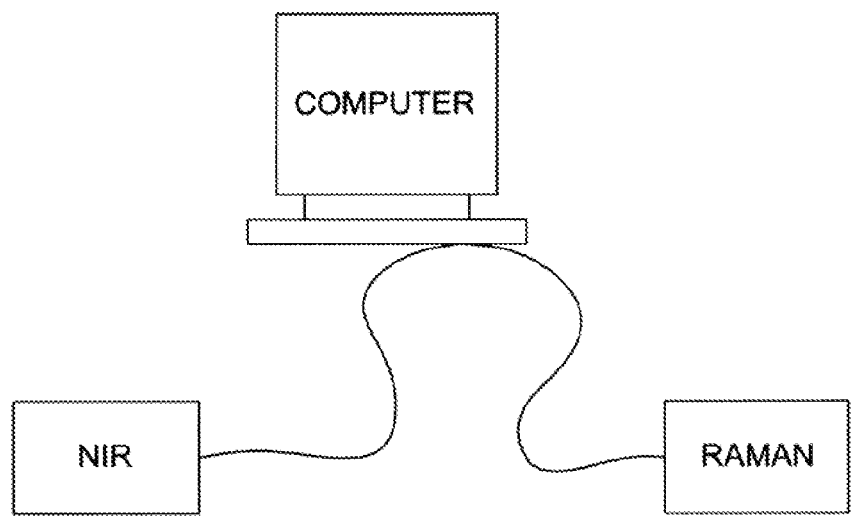
FIG. 6 is a block diagram illustrating a spectroscopy system including an independent IR spectroscopy portion (e.g., an IR spectrometer) and an independent Raman spectroscopy portion (e.g., a Raman spectrometer), where the IR spectrometer and the Raman spectrometer are each connected to a control module and/or a processing module (e.g., included in a computer) for data post-processing and/or analysis via a wired connection, a wireless connection, and so forth in accordance with example implementations of the present disclosure.
Figure 7:
FIG. 7 is a block diagram illustrating a spectroscopy system including an independent IR spectroscopy portion (e.g., an IR spectrometer) and an independent Raman spectroscopy portion (e.g., a Raman spectrometer), where the IR spectrometer and the Raman spectrometer each include a control module and/or a processing module and are connected together via a wired connection, a wireless connection, and so forth to facilitate data sharing and analysis in accordance with example implementations of the present disclosure.
Figure 8:
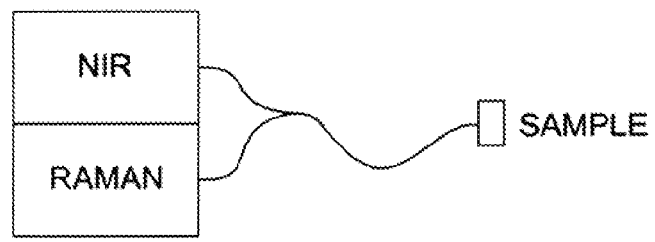
FIG. 8 is a block diagram illustrating a spectroscopy system including an IR spectroscopy portion and a Raman spectroscopy portion, where the IR spectrometry portion and the Raman spectrometry portion are included in a single instrument and IR reflectance and/or Raman scattering information is collected using a single fiber optic bundle in accordance with example implementations of the present disclosure.
Figure 9A:
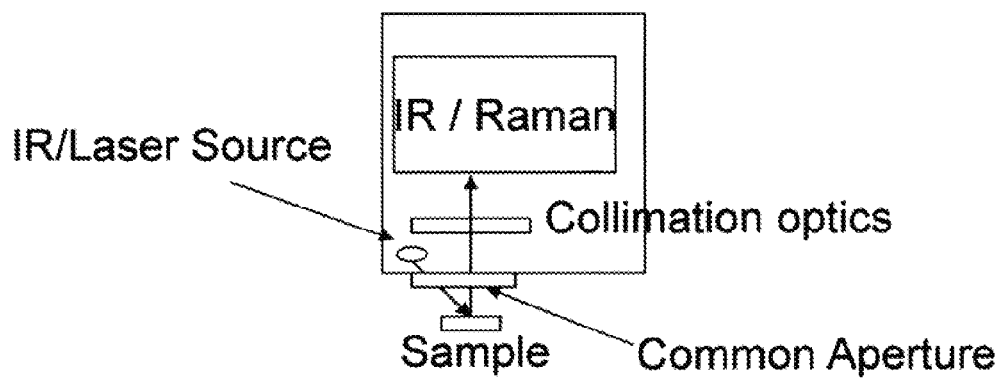
FIG. 9A is a diagrammatic illustration of a spectroscopy system including an IR spectroscopy portion and a Raman spectroscopy portion, where the IR spectroscopy portion and the Raman spectroscopy portion share a common optical path from a sampling aperture to a detection component, where the dispersive/diffractive element can be a grating, a linear variable filter, a Fabry-Perot interferometer, a Michelson interferometer, and so forth in accordance with example implementations of the present disclosure.
Figure 9B:
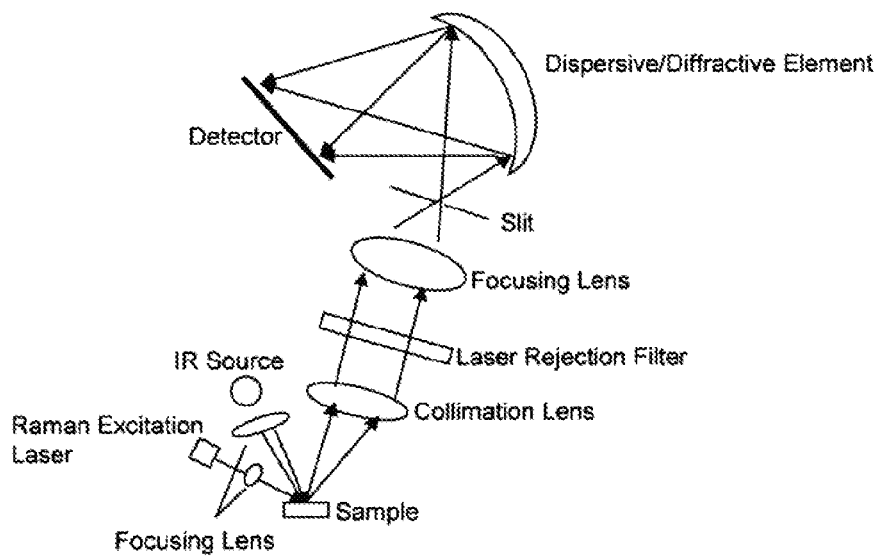
FIG. 9B is a diagrammatic illustration of a spectroscopy system including an IR spectroscopy portion and a Raman spectroscopy portion, where the IR spectroscopy portion and the Raman spectroscopy portion share a common optical path from a sampling aperture to a detection component, which can be a broadband detection component (e.g., operating in a region of the electromagnetic spectrum encompassing both Raman and IR wavelength rages), and where the dispersion/diffraction component can be a grating, a concaved grating, a flat field grating, and so forth in accordance with example implementations of the present disclosure.
Figure 9C:
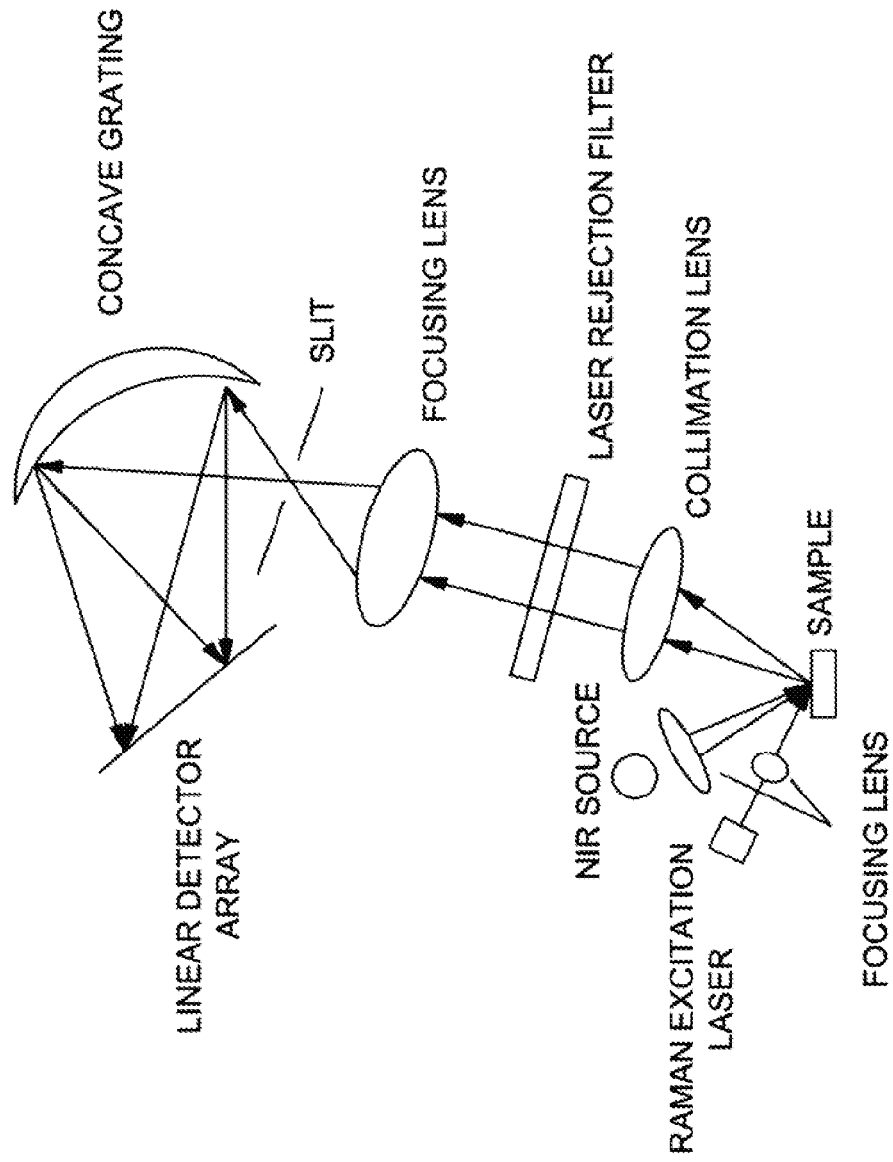
FIG. 9C is a diagrammatic illustration of a spectroscopy system including an IR spectroscopy portion and a Raman spectroscopy portion, where the IR spectroscopy portion and the Raman spectroscopy portion share a common optical path from a sampling aperture to a detection component, which can be a broadband detection component (e.g., operating in a region of the electromagnetic spectrum with wavelengths ranging from approximately seven hundred eighty-five nanometers (785 nm) to approximately seventeen hundred nanometers (1,700 nm)) in accordance with example implementations of the present disclosure.
Figure 10A:
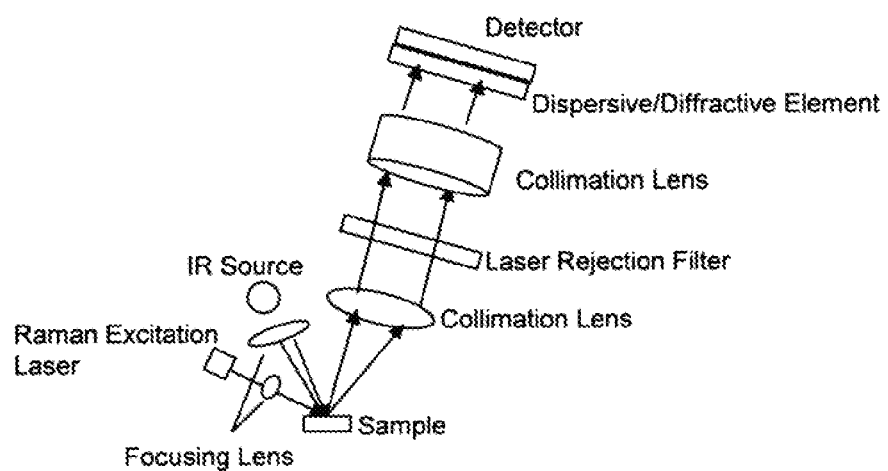
FIGS. 10A and 10B are diagrammatic illustrations of a spectroscopy system including an IR spectroscopy portion and a Raman spectroscopy portion, where the IR spectroscopy portion and the Raman spectroscopy portion share a common optical path from a sampling aperture to a detection component, which can be a broadband detection component using a linear variable filter for light dispersion in accordance with example implementations of the present disclosure.
Figure 10:
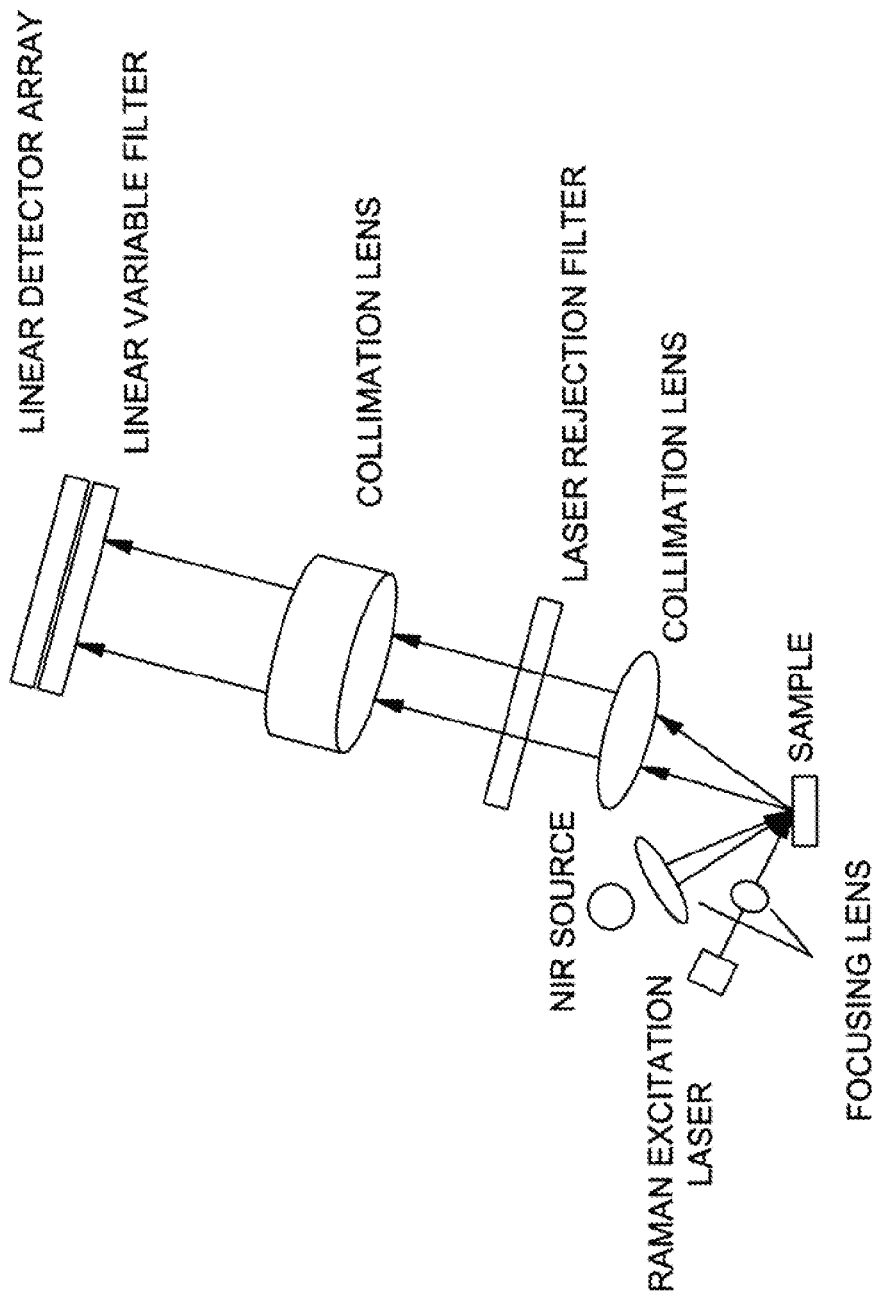
FIG. 10C is a diagrammatic illustration of a spectroscopy system including an IR spectroscopy portion and a Raman spectroscopy portion, where the IR spectroscopy portion and the Raman spectroscopy portion share a common sampling portion in accordance with example implementations of the present disclosure.
Figure 10C:
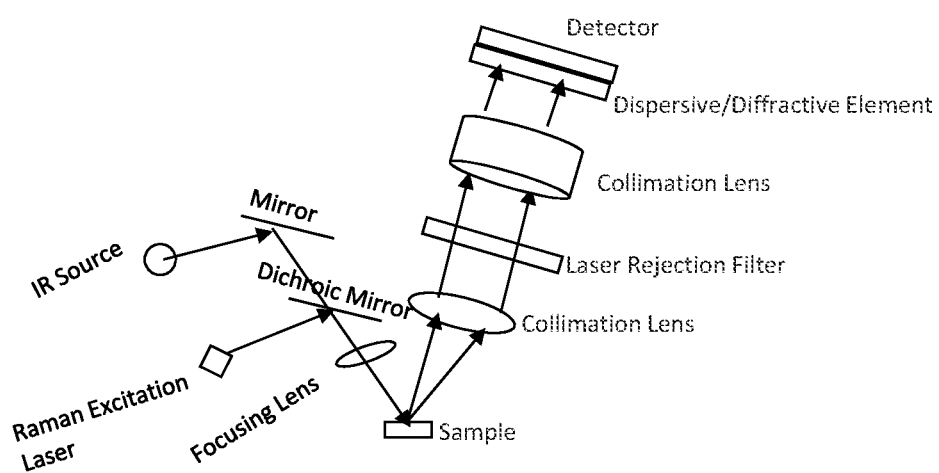
Figure 11:
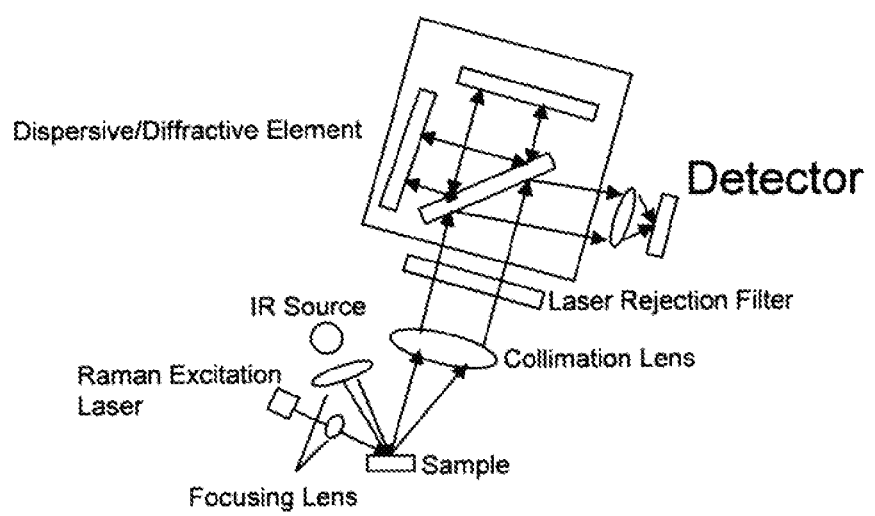
FIG. 11 is a diagrammatic illustration of a spectroscopy system including an IR spectroscopy portion and a Raman spectroscopy portion, where the IR spectroscopy portion and the Raman spectroscopy portion share a common optical path from a sampling aperture to a detection component, which can be a broadband detection component, and where the dispersion element is a Fourier transform based optical system component in accordance with example implementations of the present disclosure.

The IR spectroscopy portion and the Raman spectroscopy portion can share the same control and/or processing interface for controlling spectroscopy components and/or analyzing spectra from instrument components. In some instances, the spectroscopy system can provide a single user interface for interacting with spectroscopy components, including, but not necessarily limited to: one or more of a display, keypad, instrument control port, results display, and so forth. This can provide a simpler and/or more intuitive Concept of Operations (CONOPS), which can be adjusted depending upon a particular application (e.g., as illustrated in FIGS. 2 through 4). Further, the IR spectroscopy portion and/or the Raman spectroscopy portion can be remotely controlled using wired communication, wireless communication, and so forth.

Additionally, a common standard can be used for wavelength and/or instrument response calibration for both the IR spectroscopy portion and the Raman spectroscopy portion. In implementations, a calibration sample having known properties can be used to compute an adjusted wavelength. For example, over time components of a spectroscopy system may exhibit drift (e.g., due to temperature fluctuations, thermal expansion, vibration, shock, and so forth). Thus, a calibration sample can be used to recalibrate, for instance, a wavelength axis. Further, the Raman spectroscopy portion may also be adjusted for instrument response function, and so on. For instance, light intensity of the light source for the Raman spectroscopy portion can vary with alignment and/or optical configuration, and it may be desirable to adjust for relative intensity differences. In some instances, polynomial adjustment (e.g., polynomial correction) can be used for various wavelengths.

In some instances, a sample can be used externally (e.g., with respect to a housing), while in other instances, a sample can be used internally (e.g., within a housing) with respect to the IR spectroscopy portion and/or the Raman spectroscopy portion. For example, a plastic (e.g., polystyrene) sample having known chemical properties can be stored at least partially within or externally to a housing of one or more components of a spectroscopy system and used to calibrate operation of the IR spectroscopy portion and/or the Raman spectroscopy portion. In some instances, a calibration sample can be included as part of an aperture assembly (e.g., as a portion of a wheel opposite a substantially optically transparent window portion). The calibration sample can be positioned according to operating preferences. For example, a wheel can be rotated to perform calibration at regular intervals, semi-regular intervals, random intervals, pseudorandom intervals, and so forth. In some instances, recalibration can be performed on a daily basis, weekly basis, and so on. Additionally, a sensor, such as a temperature sensor, can be used to determine when calibration and/or recalibration may be desirable. Further, contamination of a sampling aperture, such as a window, can be measured by examining, for instance, a signal to noise ratio for the IR spectroscopy portion and/or a signal provided by Raman spectroscopy portion.

In implementations, information collected using the IR spectroscopy portion and/or the Raman spectroscopy portion can be used to adjust one or more operating characteristics of the spectroscopy system. For example, information (e.g., color information) collected from a sample using the IR spectroscopy portion can be used to adjust laser power, laser pulse duration, focusing position, and so forth for the Raman spectroscopy portion (e.g., to minimize or prevent burning and/or ignition of an energetic material). In instances where a sample is not contacted (e.g., by a window), a standoff distance can be adjusted manually and/or automatically. Further, one or more adjustable lenses for light focusing and/or signal collection can be used to adjust a standoff distance.

In implementations, spectroscopic data may be collected independently using the IR spectroscopy and/or Raman spectroscopy portions of the system, and the data can be analyzed independently and/or separately to determine molecular properties, molecular identity, components in a sample and/or mixture, and so forth.

In implementations, spectroscopic data collected independently using the IR spectroscopy portion and Raman spectroscopy portion of the system can be fused and analyzed together in a mathematical algorithmic approach to reduce false positive identifications of unknowns, to improve the probability of identifications of unknowns, to improve identifications of components in a sample and/or mixture, and so forth.

In implementations, a spectroscopy system, including some or all of its components, operates under computer control. For example, a processor can be included with or in a spectroscopy system to control the components and functions of spectroscopy systems described herein using software, firmware, hardware (e.g., fixed logic circuitry), manual processing, or a combination thereof. The terms "controller" "functionality," "service," and "logic" as used herein generally represent software, firmware, hardware, or a combination of software, firmware, or hardware in conjunction with controlling the spectroscopy systems. In the case of a software implementation, the module, functionality, or logic represents program code that performs specified tasks when executed on a processor (e.g., CPU or CPUs). The program code may be stored in one or more computer-readable memory devices (e.g., memory and/or one or more tangible media), and so on. The structures, functions, approaches, and techniques described herein can be implemented on a variety of commercial computing platforms having a variety of processors.

For example, the IR spectroscopy portion and/or the Raman spectroscopy portion may be coupled with a controller for controlling the IR spectroscopy portion and/or the Raman spectroscopy portion. The controller may include a processing module, a communications module, and a memory module. The processing module provides processing functionality for the controller and may include any number of processors, micro-controllers, or other processing systems and resident or external memory for storing data and other information accessed or generated by the controller. The processing module may execute one or more software programs, which implement techniques described herein. The processing module is not limited by the materials from which it is formed or the processing mechanisms employed therein, and as such, may be implemented via semiconductor(s) and/or transistors (e.g., using electronic integrated circuit (IC) components), and so forth. The communications module is operatively configured to communicate with components of the IR spectroscopy portion and/or the Raman spectroscopy portion. The communications module is also communicatively coupled with the processing module (e.g., for communicating inputs from the IR spectroscopy portion and/or the Raman spectroscopy portion to the processing module). The communications module and/or the processing module can also be configured to communicate with a variety of different networks, including but not necessarily limited to: the Internet, a cellular telephone network, a local area network (LAN), a wide area network (WAN), a wireless network, a public telephone network, an intranet, and so on.

The memory module is an example of tangible computer-readable media that provides storage functionality to store various data associated with operation of the controller, such as software programs and/or code segments, or other data to instruct the processing module and possibly other components of the controller to perform the steps described herein. Thus, the memory can store data, such as a program of instructions for operating a spectroscopy system (including its components), data, and so on. Although a single memory module is described, a wide variety of types and combinations of memory (e.g., tangible memory, non-transitory) may be employed. The memory module may be integral with the processing module, may comprise stand-alone memory, or may be a combination of both.

The memory module may include, but is not necessarily limited to: removable and non-removable memory components, such as Random Access Memory (RAM), Read-Only Memory (ROM), Flash memory (e.g., a Secure Digital (SD) memory card, a mini-SD memory card, and/or a micro-SD memory card), magnetic memory, optical memory, Universal Serial Bus (USB) memory devices, hard disk memory, external memory, and other types of computer-readable storage media. In implementations, the IR spectroscopy portion and/or the Raman spectroscopy portion and/or memory module may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

In implementations, a variety of analytical devices can make use of the structures, techniques, approaches, and so on described herein. Thus, although spectroscopy systems are described herein, a variety of analytical instruments may make use of the described techniques, approaches, structures, and so on. These devices may be configured with limited functionality (e.g., thin devices) or with robust functionality (e.g., thick devices). Thus, a device's functionality may relate to the device's software or hardware resources, e.g., processing power, memory (e.g., data storage capability), analytical ability, and so on.

Although the subject matter has been described in language specific to structural features and/or methodological acts, it is to be understood that the subject matter defined in the appended claims is not necessarily limited to the specific features or acts described. Although various configurations are discussed the apparatus, systems, subsystems, components and so forth can be constructed in a variety of ways without departing from this disclosure. Rather, the specific features and acts are disclosed as example forms of implementing the claims.

What is claimed is:

1. A spectroscopy system including an infrared spectroscopy portion and a Raman spectroscopy portion, the spectroscopy system comprising:
    a first electromagnetic radiation source for the infrared spectroscopy portion, the first electromagnetic radiation source configured to illuminate a sample with a first portion of electromagnetic radiation in a first region of an electromagnetic spectrum;
    a second electromagnetic radiation source for the Raman spectroscopy portion, the second electromagnetic radiation source configured to illuminate the sample with a second portion of electromagnetic radiation in a second substantially monochromatic region of the electromagnetic spectrum;
    a detector module configured to detect a sample constituent of the sample by analyzing a characteristic of electromagnetic radiation reflected from the sample associated with the first electromagnetic radiation source and a characteristic of electromagnetic radiation scattered by the sample associated with the second electromagnetic radiation source; and
    a common optical path shared by radiation from the first electromagnetic radiation source and the second electromagnetic radiation source at least at the sample constituent.

2. The spectroscopy system as recited in claim 1, further comprising a controller communicatively coupled with the detector module for receiving an indication of at least one of a presence or an absence associated with the sample constituent of the sample from the detector module, the controller operatively coupled with the second electromagnetic radiation source for initiating illumination of the sample with the second electromagnetic radiation source based upon the at least one of the presence or the absence of the sample constituent of the sample.

3. The spectroscopy system as recited in claim 1, further comprising a controller communicatively coupled with the detector module for receiving an indication of at least one of a presence or an absence associated with the sample constituent of the sample from the detector module, the controller operatively coupled with the second electromagnetic radiation source for adjusting illumination of the sample with the second electromagnetic radiation source based upon the at least one of the presence or the absence of the sample constituent of the sample.

4. The spectroscopy system as recited in claim 1, further comprising a controller communicatively coupled with the detector module for receiving an indication of at least one of a presence or an absence associated with the sample constituent of the sample from the detector module, the controller operatively coupled with the first electromagnetic radiation source for initiating illumination of the sample with the first electromagnetic radiation source based upon the at least one of the presence or the absence of the sample constituent of the sample.

5. The system as spectroscopy recited in claim 1, further comprising a controller operatively coupled with the first electromagnetic radiation source and the second electromagnetic radiation source for initiating illumination of the sample with the first electromagnetic radiation source and the second electromagnetic radiation source at least substantially simultaneously.

6. The spectroscopy system as recited in claim 1, further comprising an electromagnetic dispersion device for selectively filtering collected light from the sample onto the detector module.

7. The spectroscopy system as recited in claim 1, wherein the detector module comprises a broadband detection component operating from at least approximately one hundred ninety-three (193 nm) to at least approximately twenty-five thousand nanometers (25,000 nm).

8. The spectroscopy system as recited in claim 1, wherein the detector module comprises an indium gallium arsenide (InGaAs) array for detecting signals associated with the first electromagnetic radiation source and a charge-coupled device (CCD) array for detecting signals associated with the second electromagnetic radiation source.

9. A method comprising:
  initiating illumination of a sample with a first portion of electromagnetic radiation in a first region of an electromagnetic spectrum;
  receiving an indication of at least one of a presence or an absence associated with a sample constituent of the sample determined by detecting the sample constituent of the sample by analyzing a characteristic of electromagnetic radiation obtained from the sample associated with the first portion of electromagnetic radiation in the first region of the electromagnetic spectrum; and
  initiating illumination of the sample with a second portion of electromagnetic radiation in a second region of the electromagnetic spectrum based upon the at least one of the presence or the absence of the sample constituent of the sample.

10. The method as recited in claim 9, further comprising adjusting illumination of the sample with the second electromagnetic radiation source based upon the at least one of the presence or the absence of the sample constituent of the sample.

11. The method as recited in claim 9, further comprising initiating illumination of the sample with the first electromagnetic radiation source and the second electromagnetic radiation source at least substantially simultaneously.

12. The method as recited in claim 9, wherein collected light from a sample is selectively filtered onto a detector module using a grating.

13. A system comprising:
  an infrared radiation source configured to illuminate a sample with a first portion of electromagnetic radiation in a first region of an electromagnetic spectrum;
  a laser source configured to illuminate a sample with a second portion of electromagnetic radiation in a second substantially monochromatic region of the electromagnetic spectrum;
  a detector module configured to detect a sample constituent of a sample by analyzing a characteristic of electromagnetic radiation reflected from the sample associated with the infrared radiation source and a characteristic of Raman electromagnetic radiation scattered by the sample and associated with the laser source; and
  a linear variable filter for dispersing light from a sample onto the detector module.

14. The system as recited in claim 13, further comprising a controller communicatively coupled with the detector module for receiving an indication of at least one of a presence or an absence associated with a sample constituent of a sample from the detector module, the controller operatively coupled with the laser source for initiating illumination of the sample with the laser source based upon the at least one of the presence or the absence of the sample constituent of the sample.

15. The system as recited in claim 13, further comprising a controller communicatively coupled with the detector module for receiving an indication of at least one of a presence or an absence associated with a sample constituent of a sample from the detector module, the controller operatively coupled with the laser source for adjusting illumination of the sample with the laser source based upon the at least one of the presence or the absence of the sample constituent of the sample.

16. The system as recited in claim 13, further comprising a controller communicatively coupled with the detector module for receiving an indication of at least one of a presence or an absence associated with a sample constituent of a sample from the detector module, the controller operatively coupled with the infrared radiation source for initiating illumination of the sample with the infrared radiation source based upon the at least one of the presence or the absence of the sample constituent of the sample.

17. The system as recited in claim 13, further comprising a controller operatively coupled with the infrared radiation source and the laser source for initiating illumination of the sample with the infrared radiation source and the laser source at least substantially simultaneously.

18. The system as recited in claim 13, further comprising at least one of a plane grating, a concave grating, or a transmission grating for selectively filtering collected light from a sample onto the detector module.

19. The system as recited in claim 13, wherein the detector module comprises a broadband detection component operating from at least approximately one hundred ninety-three (193 nm) to at least approximately twenty-five thousand nanometers (25,000 nm).

20. The system as recited in claim 13, wherein the detector module comprises an indium gallium arsenide (InGaAs) array for detecting signals associated with the infrared radiation source and a charge-coupled device (CCD) array for detecting signals associated with the laser source.

\* \* \* \* \*